US011630518B2

(12) United States Patent
Chen et al.

(10) Patent No.: US 11,630,518 B2
(45) Date of Patent: Apr. 18, 2023

(54) ULTRASOUND BASED AIR-WRITING SYSTEM AND METHOD

(71) Applicant: KING ABDULLAH UNIVERSITY OF SCIENCE AND TECHNOLOGY, Thuwal (SA)

(72) Inventors: Hui Chen, Thuwal (SA); Tarig Ballal Khidir Ahmed, Thuwal (SA); Tareq Yousef Al-Naffouri, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 197 days.

(21) Appl. No.: 16/969,037

(22) PCT Filed: Jan. 22, 2019

(86) PCT No.: PCT/IB2019/050534
§ 371 (c)(1),
(2) Date: Aug. 11, 2020

(87) PCT Pub. No.: WO2019/180511
PCT Pub. Date: Sep. 26, 2019

(65) Prior Publication Data
US 2021/0033693 A1 Feb. 4, 2021

Related U.S. Application Data

(60) Provisional application No. 62/644,769, filed on Mar. 19, 2018, provisional application No. 62/695,304, filed on Jul. 9, 2018.

(51) Int. Cl.
*G06F 3/01* (2006.01)
*G01S 1/80* (2006.01)
(Continued)

(52) U.S. Cl.
CPC .............. *G06F 3/017* (2013.01); *G01S 1/807* (2013.01); *G01S 3/8086* (2013.01);
(Continued)

(58) Field of Classification Search
None
See application file for complete search history.

(56) References Cited

U.S. PATENT DOCUMENTS 8,904,312 B2    12/2014  Boillot
8,922,530 B2 *  12/2014  Pance ..................... G06F 3/038
                                                   345/179
(Continued)

FOREIGN PATENT DOCUMENTS

EP          2911089 A1 *   8/2015   ............. G06F 3/014
EP          3133474 A1     2/2017
WO    WO-2015096099 A1 *   7/2015   ............. H04B 7/086

OTHER PUBLICATIONS

Munoz, David et al., "Position Location Techniques and Applications", Academic Press Textbooks, published 2009, retrieved from Science Direct on Oct. 21, 2022 (Year: 2009).*

(Continued)

*Primary Examiner* — Christopher J Fibbi
(74) *Attorney, Agent, or Firm* — Patent Portfolio Builders PLLC

(57) ABSTRACT

A method for motion tracking and text recognition, the method including a step of generating ultrasound waves with a transmitter; a step of receiving the ultrasound waves at a receiver, the receiver including sensors that record the ultrasound waves; a step of estimating with a processor, angle-of-arrival information for the ultrasound waves; a step of associating the angle-of-arrival information with a gesture; a step of extracting features from the gesture; and a step of classifying the gesture as a specific text character based (Continued)

on the extracted features by comparing the extracted features with known text characters stored in one or more templates.

16 Claims, 14 Drawing Sheets

(51) Int. Cl.
| | |
|---|---|
| *G06F 3/023* | (2006.01) |
| *G01S 3/808* | (2006.01) |
| *G06F 3/0346* | (2013.01) |
| *G06V 30/32* | (2022.01) |
| *G06V 40/20* | (2022.01) |
| *G06N 5/01* | (2023.01) |

(52) U.S. Cl.
CPC .......... *G06F 3/0233* (2013.01); *G06F 3/0346* (2013.01); *G06N 5/01* (2023.01); *G06V 30/333* (2022.01); *G06V 30/347* (2022.01); *G06V 30/36* (2022.01); *G06V 30/373* (2022.01); *G06V 40/28* (2022.01)

(56) References Cited

U.S. PATENT DOCUMENTS

| | | | | |
|---|---|---|---|---|
| 2012/0007713 | A1* | 1/2012 | Nasi | G06F 3/0233 455/574 |
| 2014/0368434 | A1* | 12/2014 | Paek | G06F 3/017 345/156 |
| 2018/0018057 | A1* | 1/2018 | Bushnell | G06F 3/017 |
| 2018/0350121 | A1* | 12/2018 | Samuel | G06F 3/04883 |
| 2019/0034406 | A1* | 1/2019 | Singh | G06F 3/0481 |
| 2019/0056472 | A1* | 2/2019 | Smith | G01S 3/46 |

OTHER PUBLICATIONS

Abdelnasser, H., et al., "WiGest: A Ubiquitous WiFi-based Gesture Recognition System," 2015 IEEE Conference on Computer Communications (INFOCOM), Jan. 2015, pp. 1472-1480, IEEE.

Aho, A.V., et al., "Efficient String Matching: An Aid to Bibliographic Search," Communications of the ACM, Jun. 1975, vol. 18, No. 6, pp. 333-340.

Amma, C., et al., "Airwriting: Hands-free Mobile Text Input by Spotting and Continuous Recognition of 3d-Space Handwriting with Inertial Sensors," 16th International Symposium on Wearable Computers (ISWC), Jul. 23, 2012, pp. 52-59, IEEE.

Ballal, T., et al., "DOA Estimation for a Multi-Frequency Signal Using Widely-Spaced Sensors," 18th European Signal Processing Conference (EISOPCO—2010), Aalborg, Denmark, Aug. 23-27, 2010, pp. 691-695, EURASIP.

Biswas, K.K., et al., "Gesture Recognition using Microsoft Kinect®," Proceedings of the 5th International Conference on Automation, Robotics and Applications, Wellington, New Zealand, Dec. 6-8, 2011, pp. 100-103, IEEE.

Chen, H., Angle-of-Arrival-Based Gesture Recognition Using Ultrasonic Multi-Frequency Signals, 25th European Signal Processing Conference (EUSIPCO), Aug. 28-Sep. 2, 2017, pp. 16-20, IEEE.

Chen, M., et al., "Air-Writing Recognition-Part I: Modeling and Recognition of Characters, Words, and Connecting Motions," IEEE Transactions on Human-Machine Systems, Jun. 2016, vol. 46, No. 3, pp. 403-413, IEEE.

Elmezain, M., et al., "A Hidden Markov Model-Based Continuous Gesture Recognition System for Hand Motion Trajectory," 19th International Conference on Pattern Recognition (ICPR), Dec. 8-11, 2008, pp. 1-4, IEEE.

Gupta, S., et al., "Soundwave: Using the Doppler Effect to Sense Gestures," Proceedings of the SIGCHI Conference on Human Factors in Computing Systems, Austin, Texas, USA, May 5-10, 2012, pp. 1911-1914, ACM.

International Search Report in corresponding/related International Application No. PCT/IB2019/050534, dated Apr. 17, 2019.

Ketabdar, H., et al., "MagiWrite: Towards Touchless Digit Entry Using 3D Space Around Mobile Devices," Proceedings of the 12th International Conference on Human Computer Interaction with Mobile Devices and Services, Lisbon, Portugal, Sep. 7-10, 2010, ACM, New York, NY.

Liang, R.-H., et al., "A Real-time Continuous Gesture Recognition System for Sign Language," Proceedings Third IEEE International Conference on Automatic Face and Gesture Recognition, Apr. 14-16, 1998, pp. 558-567, IEEE.

Mitra, S., et al., "Gesture Recognition: A Survey," IEEE Transactions on Systems, Man, and Cybernetics—Part C Applications and Reviews, May 2007, vol. 37, No. 3, pp. 311-324, IEEE.

Pu, Q., et al., "Whole-Home Gesture Recognition Using Wireless Signals," Proceedings of the 10th Annual International Conference on Mobile Computing & Networking, Sep. 30, 2013, pp. 27-38, ACM.

Qifan, Y., et al., "Dolphin: Ultrasonic-based Gesture Recognition on Smartphone Platform," 17th International Conference on Computational Science and Engineering, Dec. 19-21, 2014, pp. 1461-1468, IEEE.

Rabiner, L.R., et al., "A Tutorial on Hidden Markov Models and Selected Applications in Speech Recognition," Proceedings of the IEEE, Feb. 1989, vol. 77, Issue 2, pp. 257-286, IEEE.

Ren, Z., et al., "Robust Part-Based Hand Gesture Recognition Using Kinect Sensor," IEEE Transactions on Multimedia, Aug. 2013, vol. 15, No. 5, pp. 1110-1120, IEEE.

Shangguan, L., et al., "Leveraging Electromagnetic Polarization in a Two-Antenna Whiteboard in the Air," Proceedings of the 12th International Conference on Emerging Networking Experiments and Technologies, Dec. 12, 2016, pp. 443-456, ACM.

Stergiopoulou, E., et al., "Hand Gesture Recognition Using a Neural Network Shape Fitting Technique," Engineering Applications of Artificial Intelligence, May 15, 2009, vol. 22, pp. 1141-1158, Elsevier.

Toriyama, C., et al., "Hand Waving Gesture Detection using a Far-infrared Sensor Array with Thermo-spatial Region of Interest," International Conference on Computer Vision Theory and Applications (VISAPP), 2016, pp. 545-551, Scitepress.

Written Opinion of the International Searching Authority in corresponding/related International Application No. PCT/B2019/050534, dated Apr. 17, 2019.

Zabulis, X., et al., "Vision-based Hand Gesture Recognition for Human-Computer Interaction," The Universal Access Handbook, 2009, vol. 34, pp. 1-59.

Zhang, X., et al., "A New Writing Experience: Finger Writing in the Air Using a Kinect Sensor," Multimedia at Work, Nov. 22, 2013, vol. 20, No. 4, pp. 85-93, IEEE.

Zimmerman, T.G., et al., "A Hand Gesture Interface Device," ACM SIGCHI Bulletin, May 1986, vol. 18, No. 4, pp. 189-192, ACM.

* cited by examiner

ULTRASOUND BASED AIR-WRITING SYSTEM AND METHOD

CROSS-REFERENCE TO RELATED APPLICATIONS

This application is a U.S. National Stage of International Application No. PCT/IB2019/050534, filed on Jan. 22, 2019, which claims priority to U.S. Provisional Patent Application No. 62/644,769, filed on Mar. 19, 2018, entitled "AN ULTRASOUND BASED AIR-WRITING SYSTEM," and U.S. Provisional Patent Application No. 62/695,304, filed on Jul. 9, 2018, entitled "ULTRASOUND BASED AIR-WRITING SYSTEM AND METHOD," the disclosures of which are incorporated herein by reference in their entirety.

BACKGROUND

Technical Field

Embodiments of the subject matter disclosed herein generally relate to a system for ultrasonic based air writing and methods for text recognition, and more specifically, to motion tracking and text recognition devices and methods.

Discussion of the Background

Human gestures are indispensable tools for expressing emotions and conveying information to others. Gestures are also involved in human-machine interactions, HMI (human-machine interactive), as most users today are interacting with electronic products as smartphones, smart TVs, somatosensory games, virtual reality, augmented reality and so on, that require human input. As alternatives to traditional devices for providing this input, e.g., keyboards, touchpads or other pressing and touching tools, new technologies based on cameras, acceleration sensors, photosensors, electromagnetic signals and ultrasound are emerging as new mediums of interaction with these smart products.

Existing vision-based methods for interacting with the smart products, separate the target (i.e., the user) from the background and then extract the hand location information from the recorded frames. Even though current commercial depth cameras improve its sensitivity to surrounding illumination conditions, the high computational complexity remains a challenge for such a device. Wi-Fi signals are cheap and ubiquitous nowadays owing to the developing of the Internet and hence become the attainable medium for the users. Wi-Fi-based systems even work for through-the-wall environment, which significantly extends the detection coverage in a complicated indoor environment. However, the subtle change of the movement is hard to be captured by the existing Wi-Fi based products.

Other products are based on the Doppler effect, i.e., the reflected signal from the moving objects will have a frequency-shift and this frequency-shift can be measured to determine the gesture. SoundWave [1] and Dolphin [2] are two systems designed to recognize a limited set of gestures. IMU-based systems, such as data gloves [3], [4], are able to detect even fingertip movement, but the drawback of these devices is the unpleasant user experience caused by the bulky wearable equipment.

Other solutions such as thermal image and Vive Lighthouse also exist. However, the former one suffers from resolution and high sensitivity to other people, while the price and required powerful processing machine for Vive VR device exclude a majority of ordinary customers. These gesture recognition systems vary from each other and can be compared in several dimensions such as signal accuracy, resolution, latency, motion range, user comfort and cost.

While the interactions between humans and machines have been improved by the above systems, compared to the spoken language, gestures are limited in the amount of information that they convey. As a result, the concept of air-writing has been introduced. This new interactive way yields flexibility in writing without touching or hand-eye coordination and it has a large potential in education, entertainment and virtual reality applications [5], [6].

Generally speaking, air writing is carried out in two steps. Hand motion is first tracked by the system by measuring the absolute or relative locations of the hand. This can be realized by estimating the true locations through trilateration in a sensor network or calculating relative locations through acceleration or gravity sensors. Then, classification models are used to recognize the text associated with the hand motion. Usually, normalization and feature extraction are performed on the data before sending it to the classifiers.

For air-writing recognition, identifying the letters is the first task for the recognition system since they are the very elementary composition of the words and sentences. The classifiers for the letters can be divided into two groups, depending on the requirement for training or not. The first group creates templates for all the possible alphabets. Thus, these training-free classifiers can recognize the letter based on the distance or the similarity between the received letter and the templates. Dynamic time warping is a classical algorithm to calculate the distance between an observed sequence of data and a template while cross-correlation gives the similarity instead. The second group, machine learning algorithms such as artificial Neural Network and Hidden Markov Model are training-based methods. An adequate amount of data needs to be collected to make the model adaptive to diverse writing styles.

However, all the above systems and methods lack the accuracy of correctly identifying a large set of hand gestures, which restricts the application of these systems. Therefore, there is a need for a new method for recognizing a large set of hand gestures that is not computationally intensive and also is more accurate than the existing methods and systems.

SUMMARY

According to an embodiment, there is a method for motion tracking and text recognition. The method includes a step of generating ultrasound waves with a transmitter, a step of receiving the ultrasound waves at a receiver, the receiver including sensors that record the ultrasound waves, a step of estimating with a processor, angle-of-arrival information for the ultrasound waves, a step of associating the angle-of-arrival information with a gesture, a step of extracting features from the gesture, and a step of classifying the gesture as a specific text character based on the extracted features by comparing the extracted features with known text characters stored in one or more templates.

According to another embodiment, there is a computing device for motion tracking and text recognition. The computing device includes a receiver having sensors that record ultrasound waves associated with a gesture; an input/output interface configured to receive the ultrasound waves recorded with the receiver; and a processor. The processor is configured to estimate angle-of-arrival information for the ultrasound waves, associate the angle-of-arrival information with the gesture, extract features from the gesture, and classify the gesture as a specific text character based on the extracted features by comparing the extracted features with known text characters stored in one or more templates.

According to yet another exemplary embodiment, there is a non-transitory computer readable medium including computer executable instructions, wherein the instructions, when executed by a processor, implement instructions for motion tracking and text recognition. The instructions include generating ultrasound waves with a transmitter; receiving the ultrasound waves at a receiver, the receiver including sensors that record the ultrasound waves; estimating with a processor, angle-of-arrival information for the ultrasound waves; associating the angle-of-arrival information with a gesture; extracting features from the gesture; and classifying the gesture as a specific text character based on the extracted features by comparing the extracted features with known text characters stored in one or more templates.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to an angle of arrival of ultrasound waves. However, the invention is not limited to ultrasound waves. Other waves can be used.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a novel system for hand gesture recognition is proposed. In the proposed system, the movement of a hand (or any other object) is tracked based on the angle-of-arrival (AoA) information of the received ultrasound signals. A handheld ultrasonic transmitter (e.g., game console, remote control, mouse, etc.) that can be triggered to send multi-frequency signals is used in this system. After detecting the signals, a controller or processor associated with the ultrasonic receiver array extracts horizontal and vertical angle information to represent the real-time location of the transmitter. To classify the angle observations into gestures, various methods are discussed later.

Figure 1:
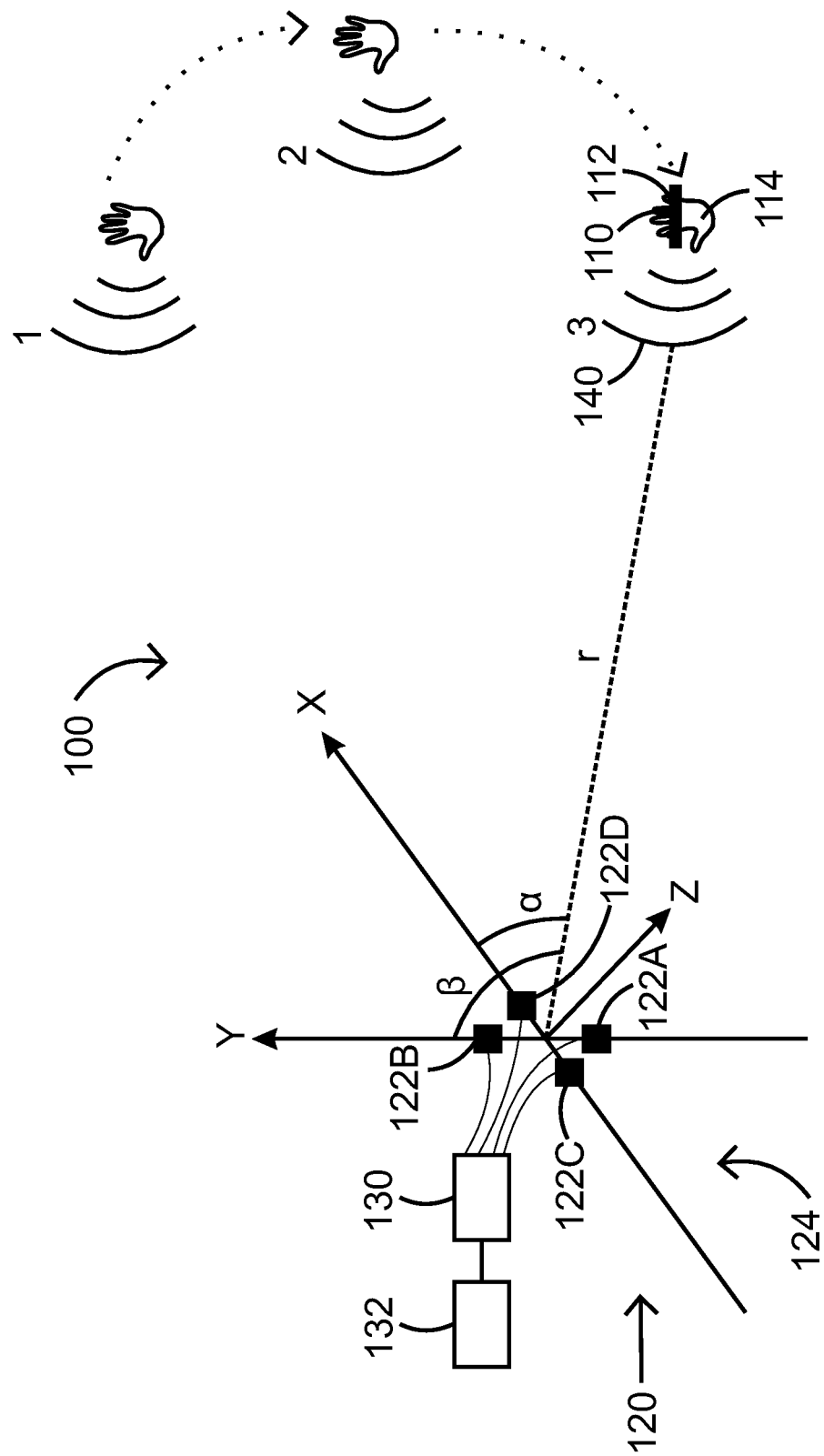
FIG. 1 illustrates an angle-of-arrival based system for detecting a gesture.

In one embodiment, the proposed system uses the fact that a 3-D location of a target (transmitter) can be represented by three elements: (1) a horizontal angle $\alpha \in [0°,180°]$, (2) a vertical angle $\beta \in [0°,180°]$, and (3) a distance r measured between the center of a receiver array 124 and a center of the transmitter 110. FIG. 1 shows the system 100 having the handheld transmitter device 110 attached to a hand 114 of a user and the receiver device 120 having the array 124 of sensors 122A-122D (only four are shown in the figure). The transmitter device 110 includes one or more transducers 112. One skilled in the art would understand that the receiver device 120 may include at least two pairs of sensors and the transmitter device 110 may include at least one sensor. FIG. 1 also shows the horizontal angle $\alpha$ and the vertical angle $\beta$ corresponding to hand location at position 3 (axis Y is aligned with the gravity in FIG. 1 and axes X and Z form a plane that is parallel to the ground). Note that FIG. 1 shows hand 114 moving from initial position 1, to intermediate position 2 and then to final position 3. For convenience, the following calculations will use angles $\theta_x=90°-\alpha$ and $\theta_y=90°-\beta$ to represent the horizontal and vertical angles in the interval $[-90°,90°]$.

Further, FIG. 1 shows that the receiver device 120 may include a processor 130 and associated memory 132. The processor 130 is connected to the sensors 122A-122D for receiving the measurement information from the sensors. This information may be stored in the memory 132. Processor 130 may be configured to process the measured information to estimate AoA for the horizontal and vertical angles as discussed later. The memory may be used to store one or more gestures recorded by the sensors and also to store a dictionary of gestures, also discussed later. Further, the processor 130 may run a classifier for calculating which stored gesture corresponds to the measured gesture. While this embodiment is discussed with regard to ultrasound waves 140 being emitted by the transmitter 110 and being recorded by the receiver 120, those skilled in the art would understand that other waves may be used with the same purpose, for example, radio frequency waves, infrared waves, etc. With this configuration of the system 100, the motion tracking part is performed with the transmitter 110 and the receiver 120 while the text recognition part is performed with the processor 130, based on the angle measurements obtained from the receiver 120.

A gesture of the hand 114 can be represented as the variation of the 3-D location of the hand with time, i.e., it can be described by the three variables $[\theta_x(t), \theta_y(t), r(t)]$. Note that each of the three variables $\theta_x(t)$, $\theta_y(t)$ and $r(t)$ changes in a unique way for each given gesture. Using all these three variables is expected to deliver better results compared to using only one or two of them. However, since calculating the distance r between the transmitter 110 and the receiver 120 requires stringent synchronization between the two devices, which adds to the system's complexity, the proposed system utilizes only 2-D AoA information, i.e., two angles $[\theta_x(t), \theta_y(t)]$ to detect and classify the hand gestures.

The system 100 is configured to perform three processes: AoA estimation, outlier rejection and gesture classification. Each of these processes is now discussed in detail.

AoA Estimation

The signal transmitted by the transmitter device 110 consists of multiple frequencies (at least two). In one application, Frequency Hopping Spread Spectrum (FHSS) ultrasonic signals are transmitted from the transmitter 110. The receiver 120 detects these signals and may label the transmitter as idle or active, based on the signal strength using thresholding. After the status of the transmitter is marked as active, a search-based AoA estimation algorithm is run by the processor 130. This estimation algorithm is now discussed. An estimate of the phase difference $\hat{\psi}_{x,i} \in (-\pi,\pi]$ at the $i^{th}$ carrier frequency $f_i$ observed between a sensor 122A and a sensor 122B of the receiver device 120 (see FIG. 2) can be estimated as the angle of the CPS (Cross Power Spectrum) of two signals (waves) 220 and 222:

$$\hat{\psi}_{x,i} = \text{ang}(Y_u(f_i) \cdot Y^*_v(f_i)) = \hat{\phi}_{x,i} - 2\pi N_{x,i}, \quad (1)$$

where $Y_u$ and $Y_v$ are the DFT (Discrete Fourier Transform) of the received signals 220 and 222 at sensor u (or 122A) and sensor v (or 122B) of the receiver device 120, "*" indicates the complex conjugate operation, $\hat{\phi}_{x,i}$ is the actual phase difference between the two signals 220 and 222 and $N_{x,i}$ is an integer. The estimation of the horizontal angle $\alpha$ is next discussed. The estimation of the vertical angle $\beta$ is omitted because it is similar to that of the horizontal angle, except that the signals used for the vertical angle are recorded by a pair of sensors perpendicular to the pair of sensors that record the signals for the horizontal angle.

Figure 2:
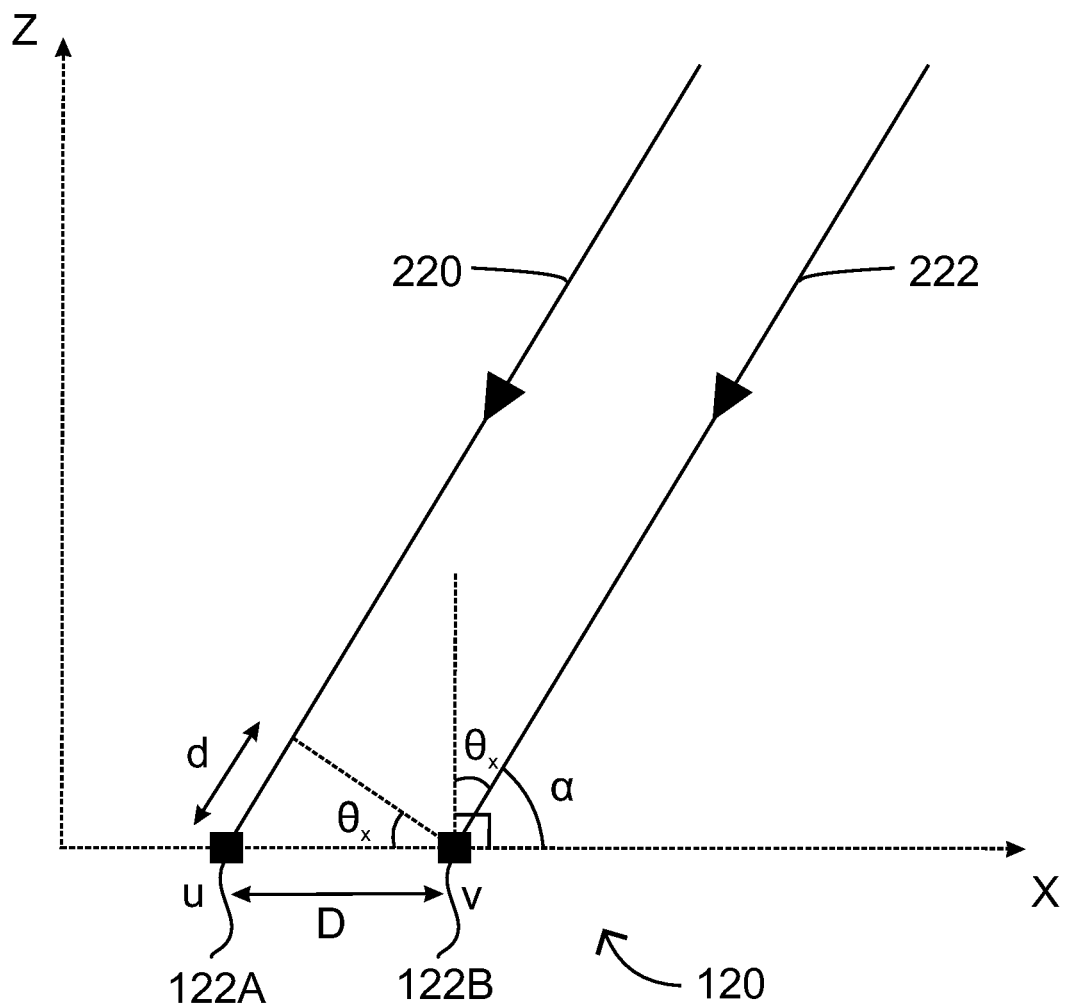
FIG. 2 illustrates plural ultrasound waves being recorded with two sensors and a geometry associated with the waves.

In a far-field scenario (i.e., a configuration in which the transmitter is far from the receiver so that the waves 220 and 222 appear to be parallel at the receiver), as shown in FIG. 2, a relationship between the actual phase difference $\hat{\phi}$ and the horizontal angle $\theta_x$ can be expressed as:

$$\sin(\theta_x) = \frac{d}{D} = \frac{\hat{\phi}_{x,i} c}{2\pi f_i D}, \quad (2)$$

where "d" is the range difference between the transmitter 110 and the two receivers 122A and 122B (see FIG. 2), c is the speed of the ultrasound waves 220 and 222, and D is the distance between the two sensors u (122A) and v (122B) along the X axis. Note that due to the range difference d, the two waves 220 and 222, even if emitted simultaneously by the transmitter 110, arrive with a time difference (i.e., phase difference) at the two receivers u and v. In other words, the time d/c necessary for wave 220 to arrive at sensor u, after wave 222 arrives at sensor v, introduces the actual phase difference $\hat{\phi}_{x,i}$ between the two waves. Equation (2) can be used to calculate the AoA. However, to solve this equation, it requires knowledge of $\hat{\phi}_{x,i}$ while only $\hat{\psi}_{x,i}$ can be observed (see equation (1)). Unless the sensor baseline D is restricted to be less than half of the wavelength of the received frequency, the integer $N_{x,i}$ is not guaranteed to be zero. Therefore, a mechanism to recover the $N_{x,i}$ integer is needed for AoA estimation using phase observations. A method was developed in [7] to recover the integer ambiguity parameters for multi-frequency signals and this idea is used herein to develop an AoA estimator without explicitly calculating the ambiguity integers $N_{x,i}$.

According to this method, the following grid search method may be used to estimate the AoA. The method searches in the range [-90°, 90°] for a horizontal angle that matches best the observations. For example, assume that angle $\theta$ describes a hypothesized transmitter 110 location. The corresponding observed (or measured) phase $\tilde{\psi}$ can be calculated/estimated, based on equations (1) and (2) as:

$$\tilde{\psi}_{x,i}(\theta) = \text{wrap}(\tilde{\phi}_{x,i}(\theta)) = \text{wrap}\left(\frac{2\pi f_i D \sin\theta}{c}\right), \quad (3)$$

where function "wrap" performs the phase wrapping operation in equation (1). For example, the function wrap may be defined, in one application, as a function that when applied to an angle $\phi$, it returns the value $\phi - 2\pi N$, where N is the closest integer to $$\frac{\phi}{2\pi}.$$

When two integers are equally close to $$\frac{\phi}{2\pi}$$

(by 0.5), the smaller integer is used. After applying equation (3) for all the available frequencies, and over the entire angle range [-90°, 90°] (using a suitable step), the final AoA estimate can be obtained as:

$$\theta_x = \arg\min_\theta \sum_{(i)} \left( |\hat{\psi}_{x,i} - \tilde{\psi}_{x,i}(\theta)| \right), \quad (4)$$

where the summation is carried over all the available frequencies $f_i$. In this way, the AoA estimation of the horizontal angle $\theta_x$ is achieved. The same process is repeated for the vertical angle $\theta_y$, but using the ultrasound waves recorded by two other sensors, perpendicular to pair of sensors u and v shown in FIG. 2.

Figure 3A:
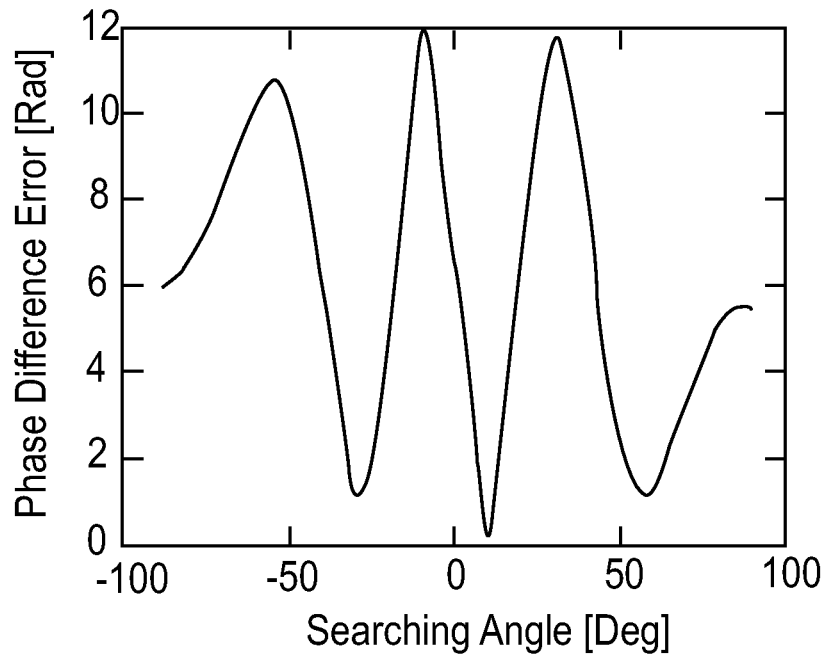
FIGS. 3A and 3B illustrate an example of a finer search related to angle-of-arrival estimation.
Figure 3B:
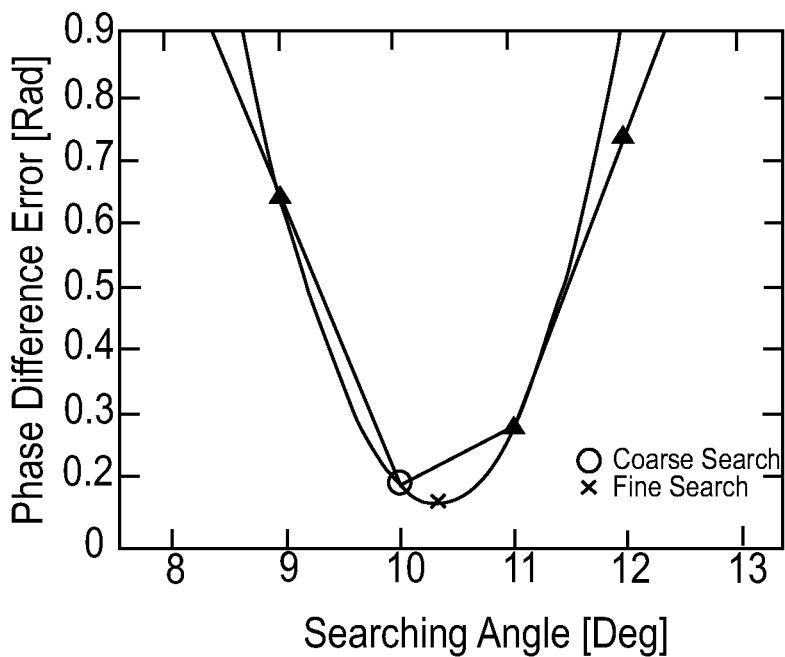

In order to obtain a finer resolution for the estimated angle, a simple parabolic curve fitting method can be used to find the extreme point as the finer search result. An example of finer search is shown in FIGS. 3A and 3B, with the correct angle being 10.3°. After a coarse search is performed by choosing the minimum error at angle 10° in FIG. 3A, a parabolic curve fitting can be applied in order to acquire a finer result, which is shown as the "x" in FIG. 3B.

Global Coordinate Transformation

Figure 4:
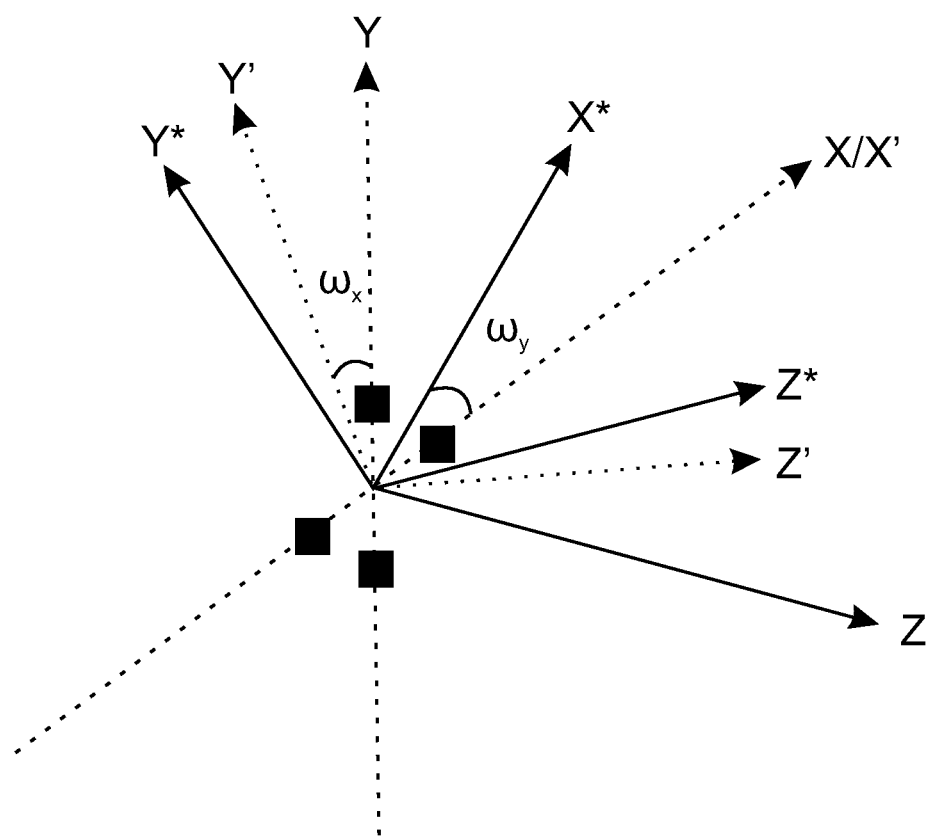
FIG. 4 illustrates a global coordinate transformation.

Calibration may be necessary when the receiver array cannot fit the global coordinate system, such as when the receiver array is employed on a slope. Such calibration can fix the unfavorable distortion of the received position data. The rotation of the receiver array should be limited within a reasonable area due to the directionality of the ultrasound sensor. Based on the knowledge of 3-D linear transformations, the real position (global position) of the target can be recovered as:

$$P_{global} = P_0 + R(P_{local} - P_0), \quad (5)$$

where $P_o$ is the location of the receiver array center, and R is the rotation matrix, which depends on the orientation of the receiver. To simplify the model, only the situation in which the line across sensor u (122A) and sensor v (122B) is parallel to the ground is considered. As such, the calibration can be done in one measurement in front of the sensor array to obtain the compensation angles $\omega_x$ and $\omega_y$. FIG. 4 illustrates this transformation, where by rotating the Y axis by $\omega_y$, the coordinates X\*, Y\*, Z\* become X', Y', Z'. Followed by the rotation along the X axis by $\omega_x$, the local system is then aligned with the global system X, Y, Z. The transform from the global coordinates to the local coordinates is in an inversed way, rotating x first, and then followed by y. By assigning $P_o$ as $[0, 0, 0]^T$, equation (5) can be simplified as:

$$P_{global}=R_y R_x P_{local}, \quad (6)$$

where $R_x$ and $R_y$ are the rotation matrices for the X axis and the Y axis, which are expressed as:

$$R_x = \begin{bmatrix} 1 & 0 & 0 \\ 0 & \cos(\omega_x) & -\sin(\omega_x) \\ 0 & \sin(\omega_x) & \cos(\omega_x) \end{bmatrix}, \quad (7)$$

$$R_y = \begin{bmatrix} \cos(\omega_y) & 0 & \sin(\omega_y) \\ 0 & 1 & 0 \\ -\sin(\omega_y) & 0 & \cos(\omega_y) \end{bmatrix}, \quad (8)$$

The horizontal offset can be compensated by rotating along the Y axis. Similarly, the X axis can be rotated to cancel vertical offset. In order to obtain $R_x$ and $R_y$, the calibration procedure includes: (1) standing in front of the system and fixing the transmitter on the Z axis of the global system, where r is the distance between the transmitter and the receiver center; (2) getting the measured horizontal and vertical angles $\theta_{x0}$ and $\theta_{y0}$ and setting the compensate angle $\omega_y = -\theta_{x0}$; and (3) calculating the compensate angle $\omega_x$ based on global location $[0, 0, r]^T$, measured local location $[r \sin(\theta_{x0}), r \sin(\theta_{x0}), r]_T$, and equations (6), (7), and (8).

Instead of the exact real location, the angle of arrival is the desired information. Thus, each measurement can be assumed as unit distance to obtain the angle information. This gives the estimation of transformed angle data based on calibrated $\omega_x$ and $\omega_y$:

$$\begin{bmatrix} \sin(\theta_x) \\ \sin(\theta_y) \\ * \end{bmatrix} = R_y R_x \begin{bmatrix} \sin(\hat{\theta}_x) \\ \sin(\hat{\theta}_y) \\ * \end{bmatrix}, \quad (9)$$

where $\hat{\theta}_x$ and $\hat{\theta}_y$ are measured angle information in one sampling.

Outlier Rejection

Next, an outlier rejection process may be performed. Due to the angle estimation errors, outliers may occur in the angle information. Given that the locations of the moving object are changing continuously, any jumps in angle measurement between two points that exceeds a pre-defined threshold can be treated as outliers. Based on this concept, an outlier rejection procedure can be adopted in which the outliers are detected by thresholding the derivative of $\hat{\theta}_x(t)$ and $\hat{\theta}_y(t)$ and replacing the outliers with the closest neighbor values. The outlier rejection algorithm shown in Algorithm 1 is adopted to remove these errors by performing: (1) getting the derivative DIF of the estimated horizontal angles $\hat{\theta}_x$ of the whole gesture; (2) finding the large jump by comparing DIF with the threshold thres as an outlier; (3) compensating the outlier with shift, which is the difference between the current sample and previous sample; (4) repeating (2) and (3) for all the horizontal angles; and (5) repeating (1)-(4) for vertical angles $\hat{\theta}_y$.

Algorithm 1 Outlier Rejection
1: shift←0
2: DIF←diff($\hat{\theta}_x$)
3: for j=0 to length($\hat{\theta}_x$) do
4: $\theta_x(j)=\hat{\theta}_x(j)$−shift
5: if abs(DIF(j))>thres then
6: shift=shift+DIF(j)
7: end if
8: end for
9: repeat for $\hat{\theta}_y$
10: return $\theta_x$, $\theta_y$ In Algorithm 1, shift is the compensation value for the outliers, diff(■) is the operation of getting the derivative, length(■) is getting the vector length, abs(■) is getting the absolute value, $\theta_x(j)$ is the estimated horizontal angle at sample j after the outlier rejection algorithm. When the first point is an outlier, extra efforts may be needed to remove DC bias. This procedure can eliminate large errors greater than the threshold.

Isolated Letter Recognition

Figure 5:
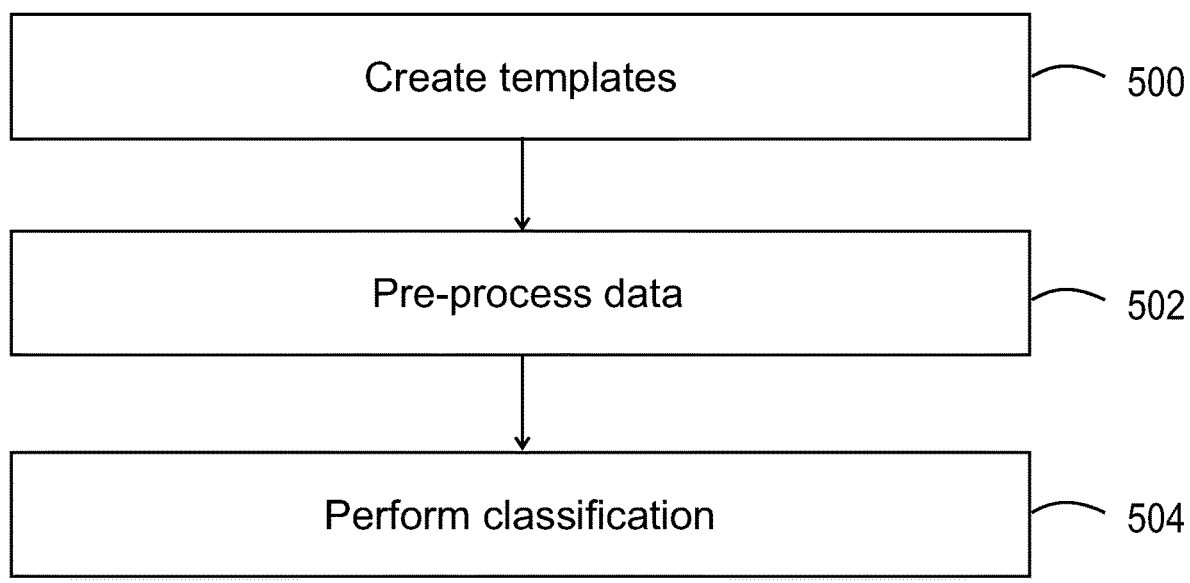
FIG. 5 is a flowchart of a method for isolated letter recognition.
Figure 6:
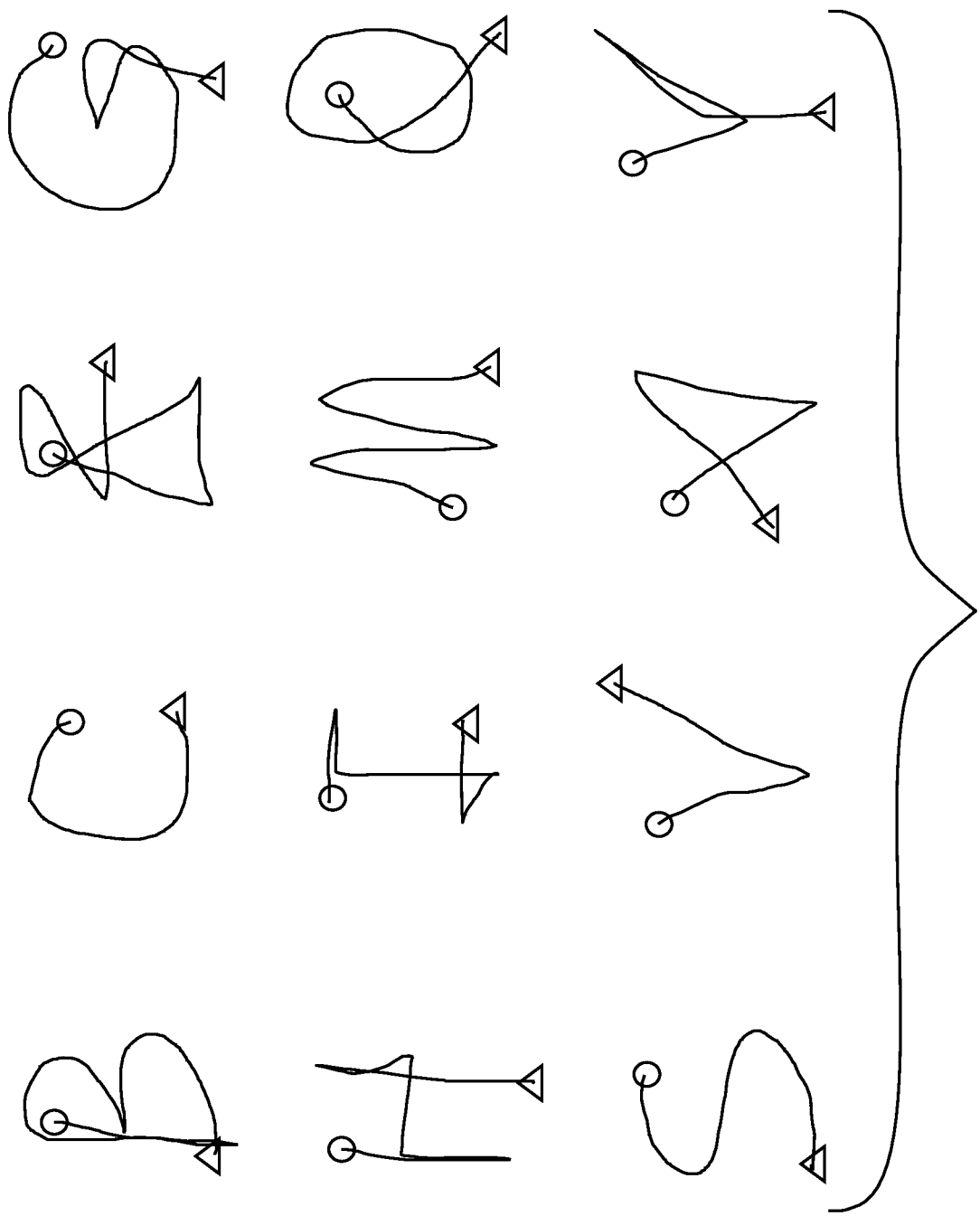
FIG. 6 illustrates an example of a letter template.

To recognize isolated letters, at least three operations are performed, as illustrated in FIG. 5. In step 500, letter templates are created. As an example, only uppercase letters are used and one or more templates are prepared for the 26 uppercase letters. A portion of the 26 uppercase letters are illustrated in FIG. 6, where each letter is written with one stroke from the circle to the triangle. The templates are saved in an M×2K matrix $D_t$, where M is the number of the letters, K is the number of samplings representing each item, and 2 indicates the angle pair. Every letter in the template matrix is described in the same length with normalized energy. The templates allow for unifying the writing styles for new users and for providing reference for training-free classifiers.

In step 502, the data is preprocessed. In isolated letter recognition, each collection is linearly interpolated and normalized into a vector to meet the size of the template matrix as:

$$g^{(1 \times 2K)} = [g_x, g_y], \quad (10)$$

where $g_x$ and $g_y$ are the vectors containing horizontal and vertical angle information of the letter, respectively. The direction for certain points can also useful. This property can segment each letter into several states, and also provides extra information in classification. The direction between two points is defined as a normalized vector $O_i$ calculated by:

$$O_i = \frac{P_j - P_i}{\|P_j - P_i\|_2}, \quad (11)$$

where $P_i$ is the position (angle location) of the $i^{th}$ sample. Due to the similarity of adjacent direction, a threshold is set to make sure $P_i$ and $P_j$ are far enough, and hence O is a subsampled sequence. This information is used in some of the classifiers discussed next.

In step 504, the classification is performed. The classification can include two training-free methods, which compare a received letter with the templates and find the most likely one based on the relevance calculated by redundant dictionary (RD) matching and dynamic time warping (DTW). Furthermore, both of these training-free methods are improved by performing redundant dictionary matching with a decision tree (RD-DT) and direction dynamic time warping (D-DTW) for achieving higher accuracy. In addition, two other learning-based classification models, neural network (NN) and hidden Markov model (HMM) can be used as benchmarks.

Figure 7:
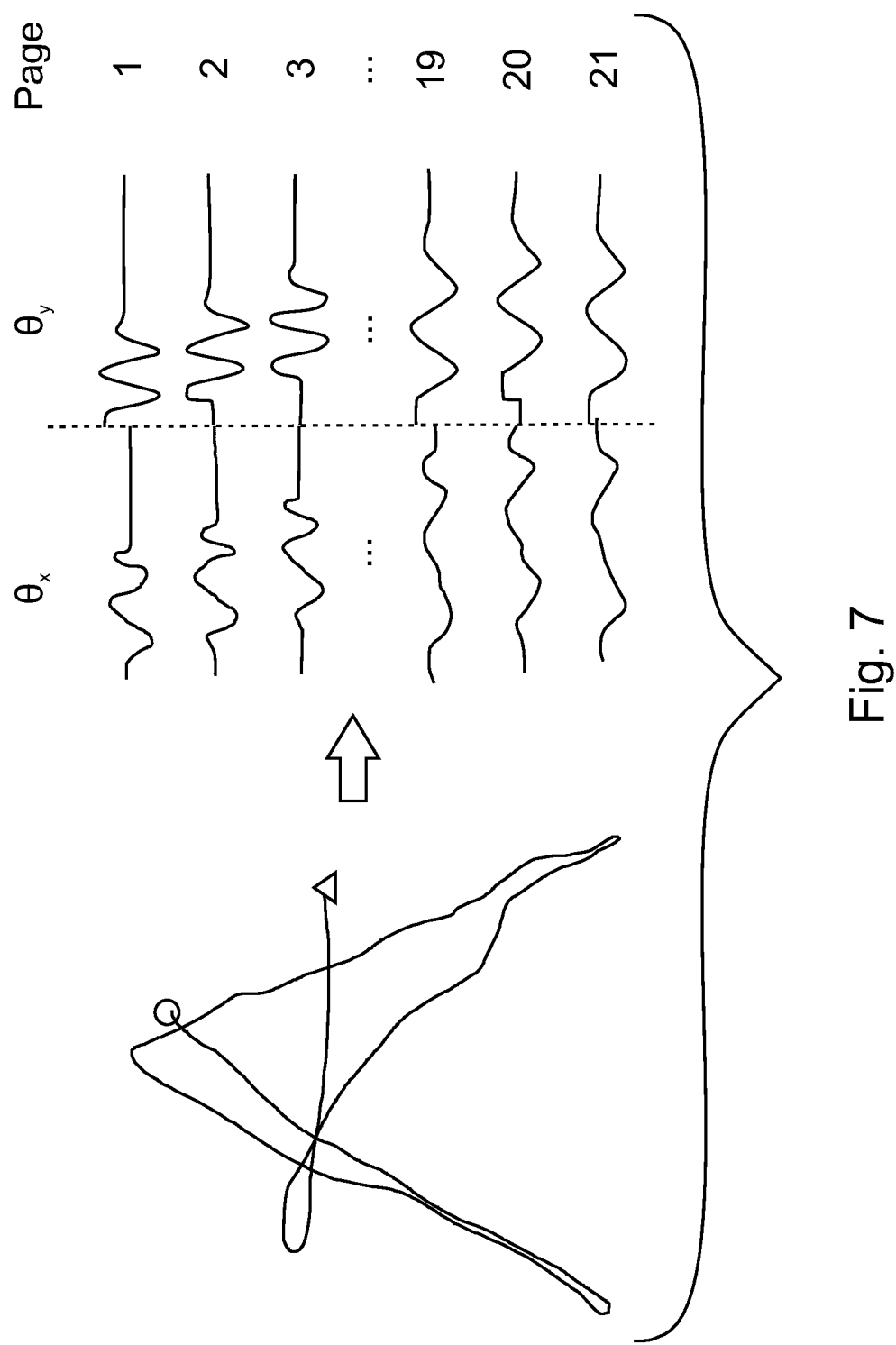
FIG. 7 illustrates an example of a redundant dictionary.

Redundant dictionary extends the original template from an M×2K matrix $D_t$ to an nM×2K matrix $D_r$ based on shift and shrink to fit users with different writing speed or style. Part of the redundant dictionary is shown in FIG. 7, where the templates in page 1 to page 20 are extended from the template in page 21. Angles $\theta_x$ and $\theta_y$ infer the horizontal and vertical angle change in the whole writing duration. The value increase in $\theta_x$ indicates the movement from left to right, while the increase in $\theta_y$ indicates the change from bottom to top. The cross correlation between the detected letter and the reference letter can be calculated by a matrix multiplication:

$$V = D_r g^T, \quad (12)$$

where $D_r$ is the redundant dictionary matrix and $g^T$ is the transpose of the normalized received letter vector, and the peak value in vector V indicates the highest similarity with the reference letter.

However, this RD algorithm may not work well on similar items, for example, letters 'M' and 'N'. For example, it may clip the first half part of 'M' and treat it as an 'N'. However, this issue can be solved by utilizing the direction sequence from data preprocessing in step 502. For example, if the detected letter is 'M' or 'N', 'M' will be chosen if the last element of the direction is pointing down and, vice versa, 'N' will be chosen if the last element of the direction is pointing up. Similar branches, such as (B,F), (P,R), and (I,J) can be included to form a decision tree after acquiring the classification results from RD.

DTW is an algorithm designed to measure the similarity between two sequences. This algorithm is particularly useful on the sequences varying in speed. The received data is compared with each of the 26 letters in the template and is classified as the letter with the minimum DTW distance. When measuring the DTW distance between the received data and the $m^{th}$ letter in the template, a cost matrix is calculated with elements:

$$S_{ij}^m = \begin{cases} \sum_{j=1}^{K} C_{i,j} & i = 1 \\ \sum_{i=1}^{K} C_{i,j} & j = 1 \\ \min\{C_{i-1,j-1}, C_{i-1,j}, C_{i,j-1}\} & \text{others} \end{cases} \quad (13)$$

where $C_{ij}$ measures the difference between the $i^{th}$ sample of the received sequence and the $j^{th}$ sample of the template sequence. More specifically:

$$C_{ij}^m = |g(i) - D_t(m,j), (g(i+K) - D_t(m,j+K))|_2, \quad (14)$$

where $g(i)$ is the normalized horizontal angle at sampling point i, $g(i+K)$ is the corresponding vertical angle, and $D_t(m, j)$ and $D_t(m, j+K)$ are the horizontal and the vertical angle of the $m^{th}$ letter in the template matrix at sampling point j.

In real applications, however, the writing styles are varying and thus the locations may not match well. In addition, a large number of sampling points affect the processing time.

In this case, translating the template matrix into a subsampled direction sequence to match the received letter is another choice and this method is the Direction-DTW (D-DTW). As a consequence, elements $C^m_{ij}$ in the equation (14) can be calculated as the normalized cosine distance as follows:

$$C_{ij}^m = \cos^{-1}\left(\frac{O_i O_j^m}{\|O_i\|_2 \|O_j^m\|_2}\right) / \pi, \quad (15)$$

where $O_i$ is the $i^{th}$ direction element of the receiving direction sequence, as defined in equation (11), and $O^m_j$ is the $j^{th}$ direction element of the $m^{th}$ letter.

In the NN model, the raw angle data is directly used to train the neural network model. A full deep network can be built with two autoencoders connected with a softmax layer. The hidden layer size for each autoencoder can be 100 and 50, respectively. This model can be trained with collected horizontal and vertical angle sequences and realized in MATLAB 2016b using Matlab Neural Network Toolbox. When a received angle sequence is input to the trained NN, it will be recognized as a letter according to the classification result of the NN.

Figure 8B:
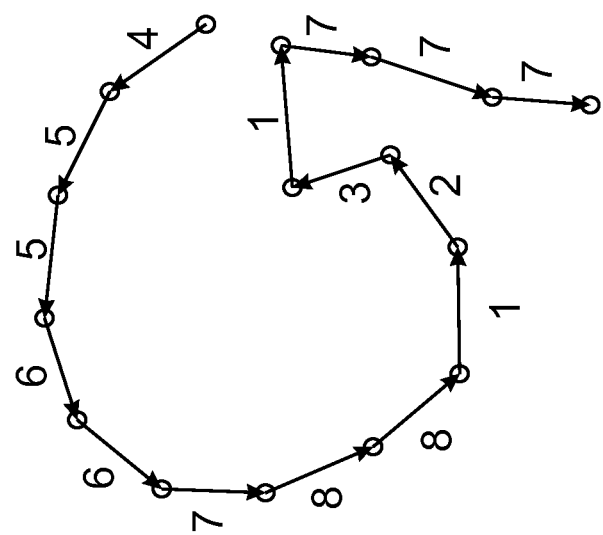
FIGS. 8A and 8B illustrate an example of a state feature extraction procedure.
Figure 8A:
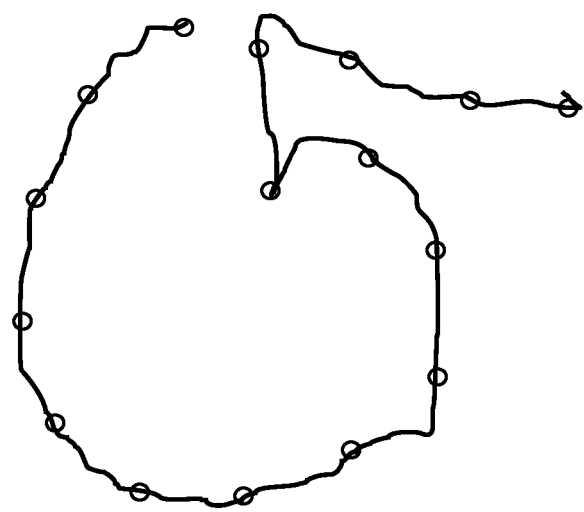

HMM models the writing process as several interconnected states. 8 symbols can be used to represent the directions in sequence O and define, for example, [−22:5, 22:5) as state 1, [22:5, 67:5) as state 2, and continue until state 8. One example of state feature extraction procedure is shown in FIGS. 8A and 8B, where original letter 'G' is shown in FIG. 8A and FIG. 8B shows the discretized version of the letter 'G' as a sequence [4; 5; 5; 6; 6; 7; 8; 8; 1; 2; 3; 1; 7; 7; 7]. In total, twenty-six models can be built individually with different state numbers based on their complexity, and model type can be chosen as left-right model with max jump step equal to 2. In HMM, the transition probability distribution and observation symbol probability distribution can be initialized randomly. Then gesture data of each letter in the template is used to train the corresponding HMM model. To recognize a received sequence, the sequence can be input to each of the 26 trained models, which produces a probability indicating the fitness. The received sequence can be classified as the letter whose model gives the maximum probability.

Continuous Word Recognition

After isolated letter recognition, the next logical step is continuous word recognition. It is easy to form a word with several isolated letters and use a correction model to check the spelling if necessary. However, the users have to stop and start at an interval between adjacent letters when writing a word. To provide a better user experience of writing a word without pauses, several challenges should be addressed:

1) The interval separating each letter is unknown and the connections may be detected as part of the letter;

2) It is hard to normalize the received words since every word has different durations and letter compositions; and 3) A huge amount of data is required for training recognition models if each word is treated individually.

By utilizing the prior knowledge of the vocabulary, this problem can be addressed with lower complexity.

One solution for continuous word recognition is word segmenting and matching (SM). Each word consists of several letters and is formed in a certain sequence. Without loss of generality, it can be assumed that the average writing time of each letter is known. Then a word with duration $t_d$ can be segmented into $I_k$ parts:

$$SEG_{k,i} = \frac{t_i}{\sum_{i=1}^{l_k} t_i} t_d, \quad (16)$$

where $t_i$ is the average writing time of the $i^{th}$ letter in the word, and $I_k$ is the number of letters that word k contains.

Figure 9A:
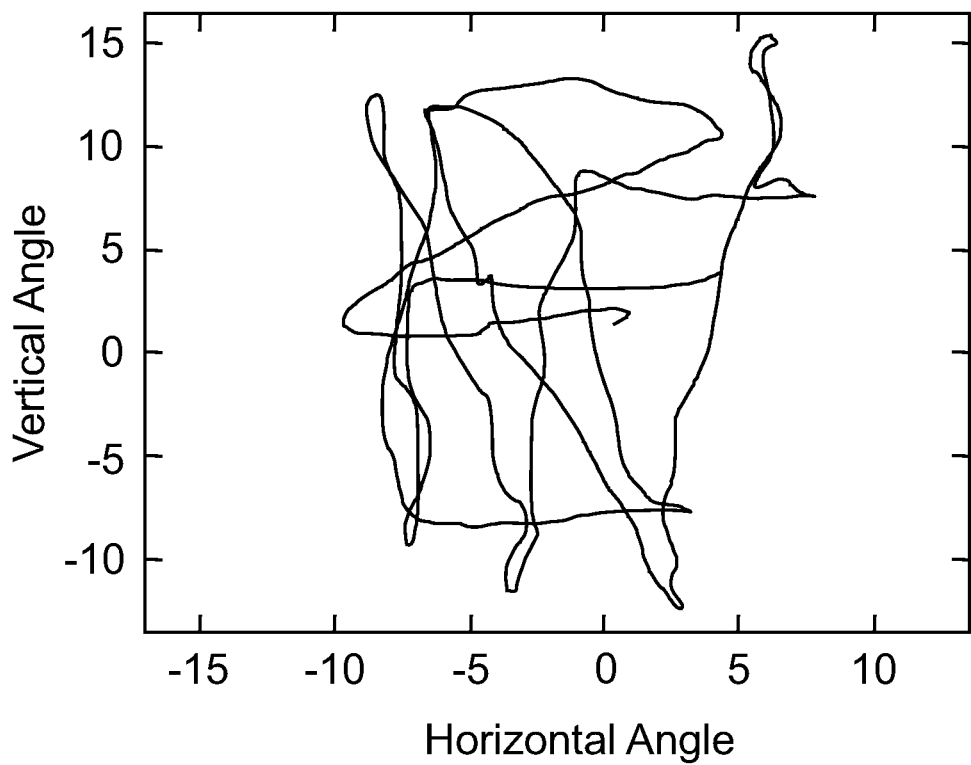
FIGS. 9A and 9B illustrate an example of word segmenting.
Figure 9B:
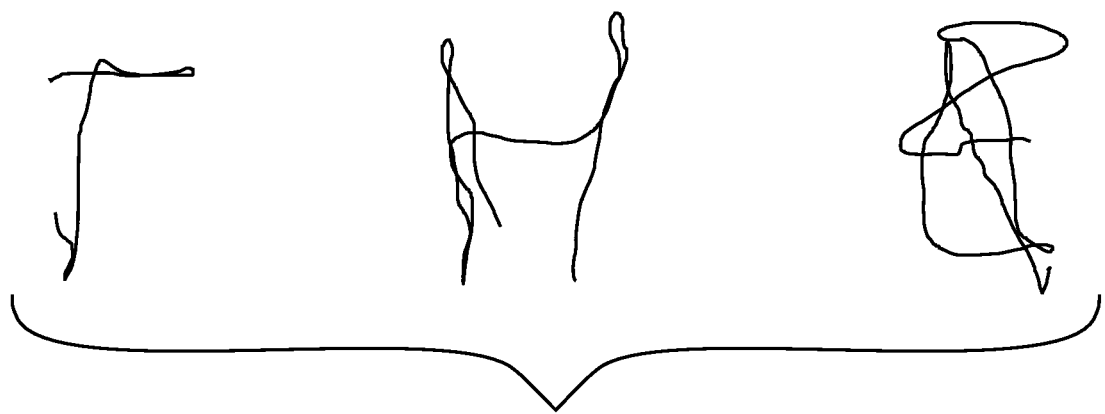

The similarity $P_k$ of a given sequence to a known word k can be defined as:

$$P_k = l_k^2 \cdot \prod_{i=1}^{l_k} p_i, \quad (17)$$

where $p_i$ is the max correlation value between the normalized $i^{th}$ segment and $i^{th}$ letter of word k using the matrix from equation (12), and $I^2_k$ is a coefficient that compensates long words letter production value loss. Given a word sequence, the similarity to each word in the whole vocabulary is calculated. The word in the vocabulary with the highest similarity is reported to be the best candidate. An example of this method is shown in FIGS. 9A and 9B. The original word is shown in FIG. 9A, and the segmentation based on equation (16) is shown in FIG. 9B.

Figure 10:
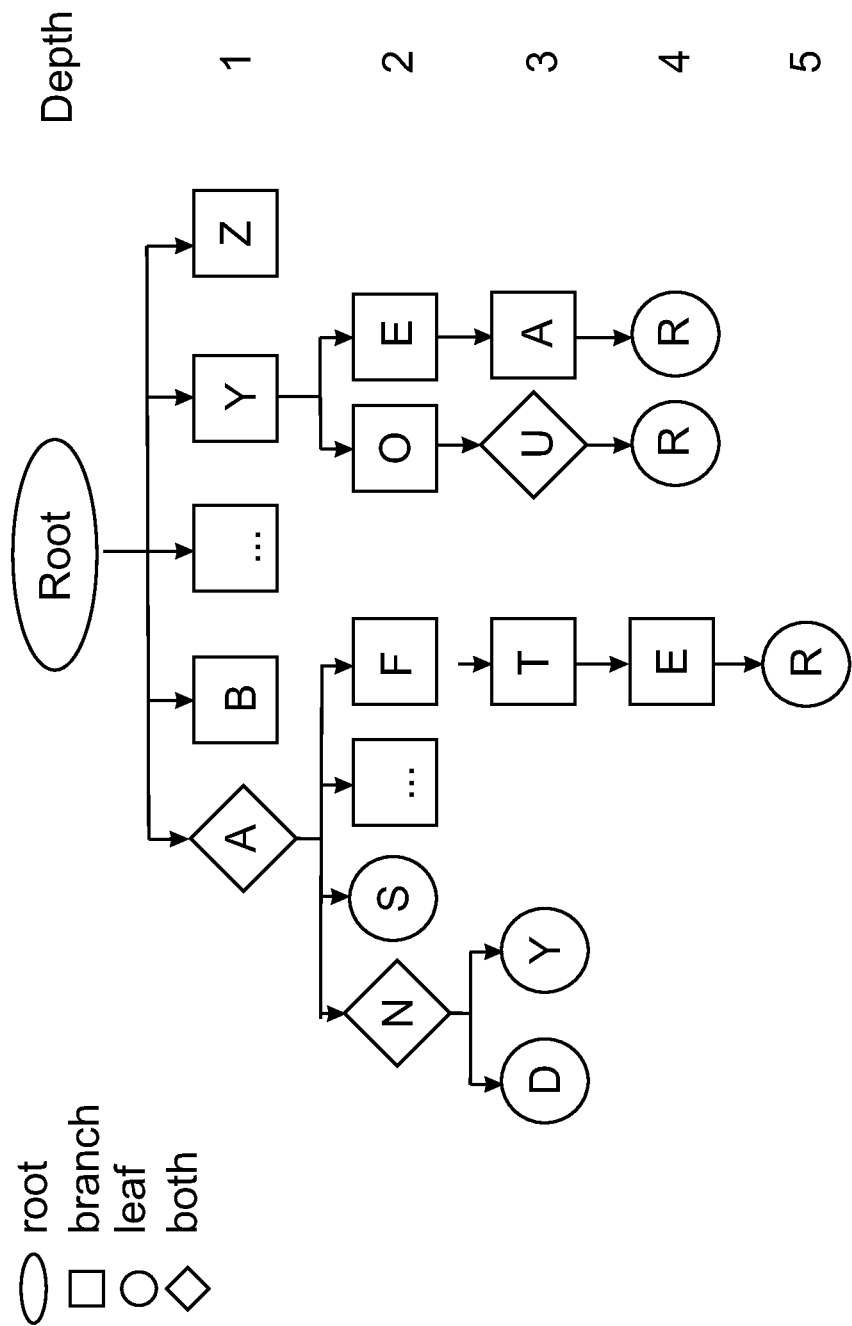
FIG. 10 illustrates an example of a prefix tree.

Another solution for continuous word recognition is letter filtering (LF). In word recognition, the vocabulary can be constructed with the 100 most frequently used English words. These words can be separated into letters and stored in a prefix tree for fast retrieval, as shown in FIG. 10. Every node has a structured data type with a list of parameters. There are four types of nodes, including root, branch, leaf, and both (which means this node is a leaf as well as a branch). The details of nodes 'AN' and 'LO' are shown in Table I. This tree structure helps the system to complete the whole word with several candidate letters.

TABLE I

NODE INFO EXAMPLE

| Attributes | node 'AN' | node 'LO' |
|---|---|---|
| Value | AN | LO |
| Current_Value | N | O |
| Index | 11 | 154 |
| Parent_Ind | 10 | 105 |
| Parent_Value | A | L |
| Children_Ind | 12, 206 | 155 |
| Children_Ind | AND, ANY | LOO |
| Type | both | branch |

Figure 11:
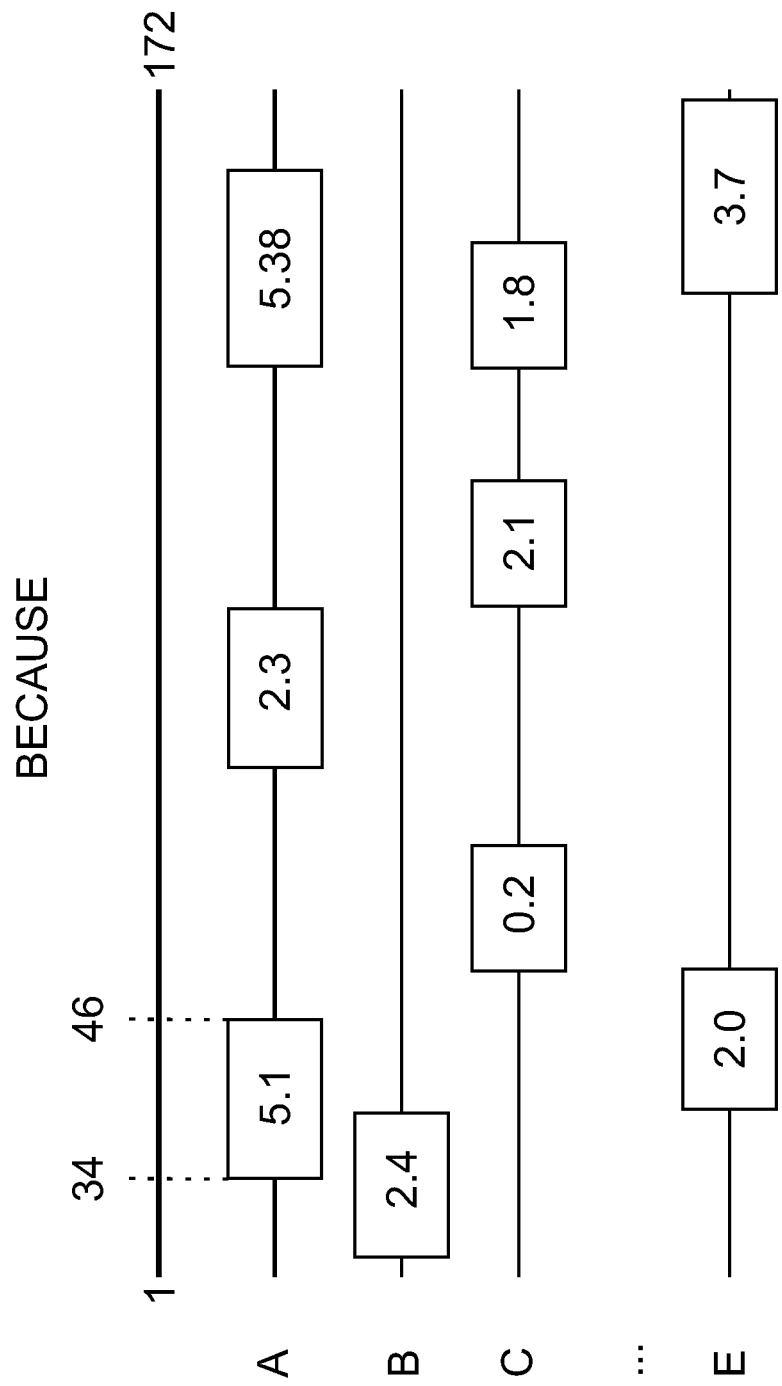
FIG. 11 illustrates an example of letter filtering results.

The number of the sampling points in a word is several times larger than a letter. In order to reduce the computational complexity and increase the robustness of the system, a similar approach to D-DTW is used to filter the possible letters. Word D-DTW starts by calculating the direction cost matrix between the word and the template. The accumulated cost matrix S is defined as:

$$S^m_{i,j} = \begin{cases} C_{i,j} & i = 1 \\ \sum_{i=1}^{K} C_{i,j} & j = 1 \\ \min(C_{i-1,j-1}, C_{i-1,j}, C_{i,j-1}) & \text{others} \end{cases} \quad (18)$$

which differs from equation (13) in that each letter reference can start at any point, and the starting position can be kept in each calculation of the matrix element. In the last column of the matrix $S^m$, every element contains the start position $P_{1\_ij}$, the current position $P_{2\_ij}$ and the cost $S^m_{ij}$, which means during the area [P1; P2] in this word, this segment has the distance of $S^m_{ij}$ with the $m^{th}$ letter. With this given information, the average distance can also be calculated. All candidate letters with an average distance smaller than the threshold $thres_{letter}$ can be filtered into a list $L_{letter}$ that contains information of candidate start position $P_1$, stop position $P_2$ and distance $D_{is}$. One example of the word D-DTW result is shown in FIG. 11. In this figure, the word has the direction length of 172 and the distance between fraction and letter 'A' is 5:1. A constraint of maximum and minimum length of the sequence can be favored to eliminate some obvious errors and reduce calculation.

The concept of a letter filtering algorithm can utilize the candidate letter list $L_{letter}$ from word D-DTW and match them with the prefix tree to find the candidate word. This algorithm matches the candidates step by step from the root of the prefix tree to the deepest leaf. After evaluating the candidates in depth w, top $C_{num}$ candidates with the least average distance can be kept in the list $L_w$. List $L_w$ contains all the information of the candidate, such as candidate value V, stop position Stop, coverage samples $C_{vg}$, accumulated distance $D_{is}$, average distance $D_{avg}$ and finish indicator F. The candidates in depth w+1 will be all the children nodes of the node in list $L_w$. Take the candidates in w=1, for example, they will be all the children nodes of the Root node.

The whole algorithm can be summarized in several steps:
1) Initialize the list $L_w$ by setting $L_0.V$='ROOT', $L_0.Stop=1$, $L_0.C_{vg}=0$, $L_0.D_{is}=0$, $L_0.D_{avg}=0$, $L_0.F=0$ and DEPTH=0;
2) While loop [$L_{w+1}$; depth]=update_LF($L_w$; depth) until all the $L_w.F$ values are 1; and
3) The final $L_w$ contains all the possible word candidates and their information, where update LF(■) is the function that update candidates list $L_{w+1}$ in depth w+1 as shown in Algorithm 2. $WIN_{max}$ is the window size for starting area, $C_{num}$ is a the max candidate number kept to the next depth which can also be designed as a vector to keep different number of candidates in different depth. In 'Update $L_{new}$.all' procedure, all the related values except $L_{new}.F$ will be updated. In 'Check Validity' procedure, $L_{new}.F$ can be set as 1 for 'leaf' node, set as 0 for 'branch' node, and duplicated and set as 1 and 0 for 'both' node. In addition, the candidate in $L_{new}.F$ can be removed if the word is incomplete until end of the processing. This algorithm can also be applicable to recognize a complete pattern consisting of a series of simple events.

---

Algorithm 2 update_LF

```
1:   count ← 1
2:   WIN_max ← 10
3:   for i = 0 to lenglh(L_w) do
4:       if L_w.F(i) = 0 then
5:           S_area ← (L_w(i).Stop) to (L_w(i).Stop + WIN_max)
6:           L_c ← find(L_letter.P_1 in S_area)
7:           for j = 0 to length(L_w(i).V.children) do
8:               L_new ← find(L_w(i).V.children(j) in L_c)
9:               Update L_new.all
10:          end for
11:      end if
12:  end for
13:  Check Validity and Pick Top C_num with least D_avg in L_new
         as L_{w+1}
```

-continued

Algorithm 2 update_LF

14:  depth ← depth + 1
15:  return $L_{w+1}$, depth

Figure 12:
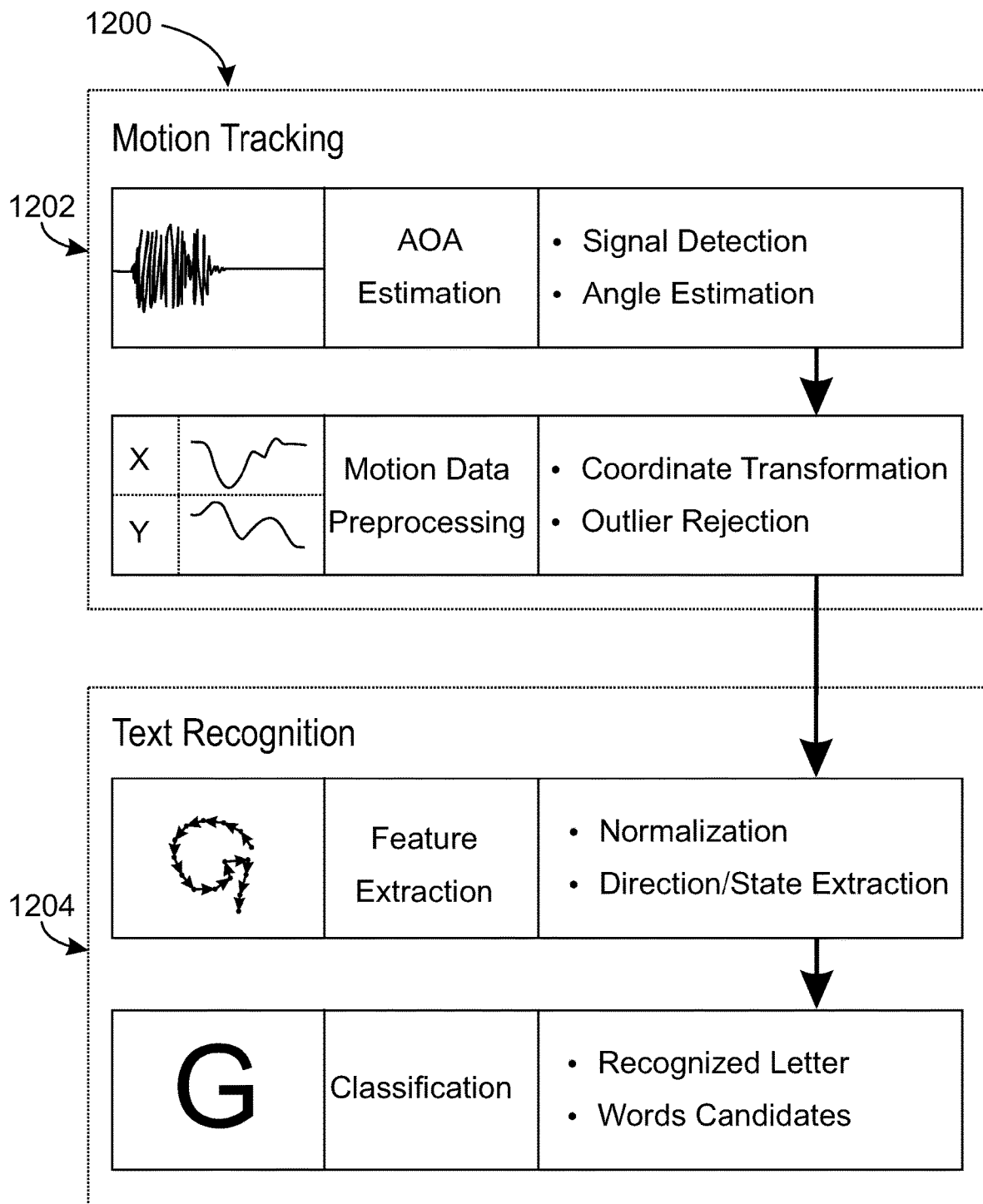
FIG. 12 is a system diagram of an ultrasonic air-writing system.

An ultrasound-based text recognition system is now discussed with regard to FIG. 12. The ultrasonic-based text recognition system is provided with letter classification performance that is evaluated with several classifiers. The structure of the proposed ultrasonic air-writing system 1200 contains two main modules, a motion tracking module 1202 and a text recognition module 1204. The motion tracking module extracts angle information from original ultrasonic signals to represent gesture locations. Then templates are built, feature extraction algorithms are applied, and classifiers are used to recognize the collected letters. Finally, the algorithms for isolated letter recognition and continuously written word recognition and prediction are applied.

In the motion tracking module 1202, the multi-frequency ultrasonic signal can be transmitted from a hand-held transmitter. A receiver array (see FIG. 1) can detect and label the hand status as idle or active based on signal strength using thresholding. After the status is marked as active, a search-based angle-of-arrival estimation algorithm can be implemented to acquire angle information of the hand. For the local coordinate system that is not aligned with a global system, the measured local angle can be transformed into a global angle. After that, outlier rejection is performed to produce the final motion information.

Differing from traditional writing, air-writing is recorded continuously in one stroke and in a 3-D space, which is usually confined to a limited active area. The receiver may receive writing in a variety of styles or scales. In order to classify the letters from different users, normalization can be performed in order to unify the writing scale. In addition, extracting the features in module 1204, such as direction, can provide extra information for some classifiers, such as decision tree and HMM. Dynamic time warping and redundant dictionary matching can be used as training-free algorithms. Based on that, D-DTW and RD-DT can be executed in order to improve the performance. These algorithms can also be compared with NN and HMM trained by the volunteer data.

For word recognition within a limited vocabulary, a plain way is treating each word as a single sequence of movements. Nevertheless, the long length of this kind of sequence increases the difficulties in model training and data collection. Based on the previous work on letter classification, an intuitive way is segmenting the word with the prior knowledge of statistic average writing time of each letter and matching them individually. For a larger word pool, however, identifying each letter in the sequence and completing the whole word is a preferred solution. In this case, a prefix tree is used to make sure the correctness of the written word and helps the system to reduce the complexity for a real-time system.

Figure 13:
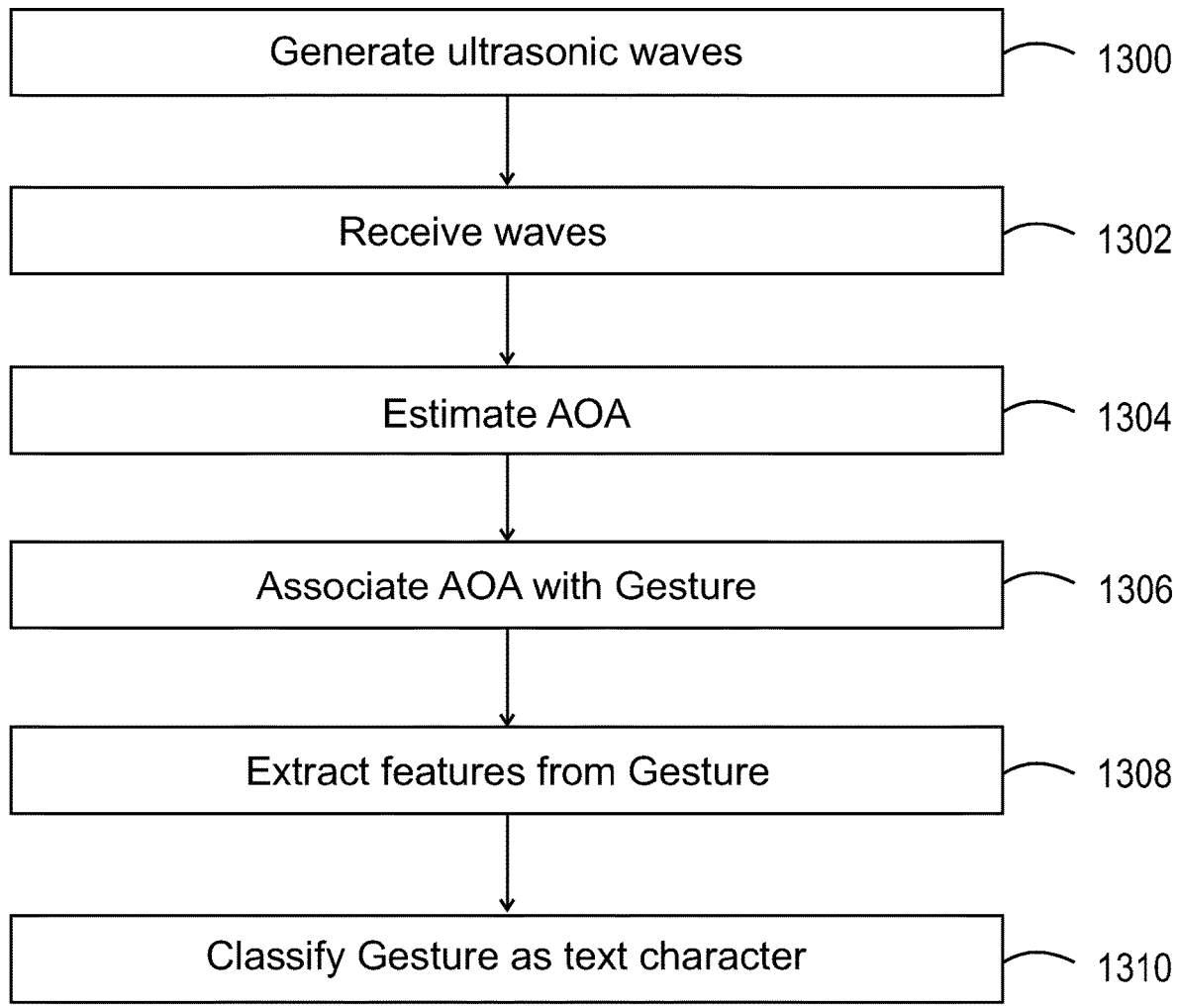
FIG. 13 is a flowchart of a method for motion tracking and text recognition.

A method for motion tracking and text recognition is now discussed with regard to FIG. 13. In step 1300, ultrasound waves are generated with a transmitter. In step 1302, the ultrasound waves are received at a receiver that includes sensors that record the ultrasound waves. In step 1304, a processor estimates angle-of-arrival information for the ultrasound waves. In step 1306, the estimated angle-of-arrival information is associated with a gesture. In step 1308, features are extracted from the associated gesture. In step 1310, the gesture is classified as a specific text character based on the extracted features by comparing the extracted features with known text characters stored in one or more templates.

Figure 14:
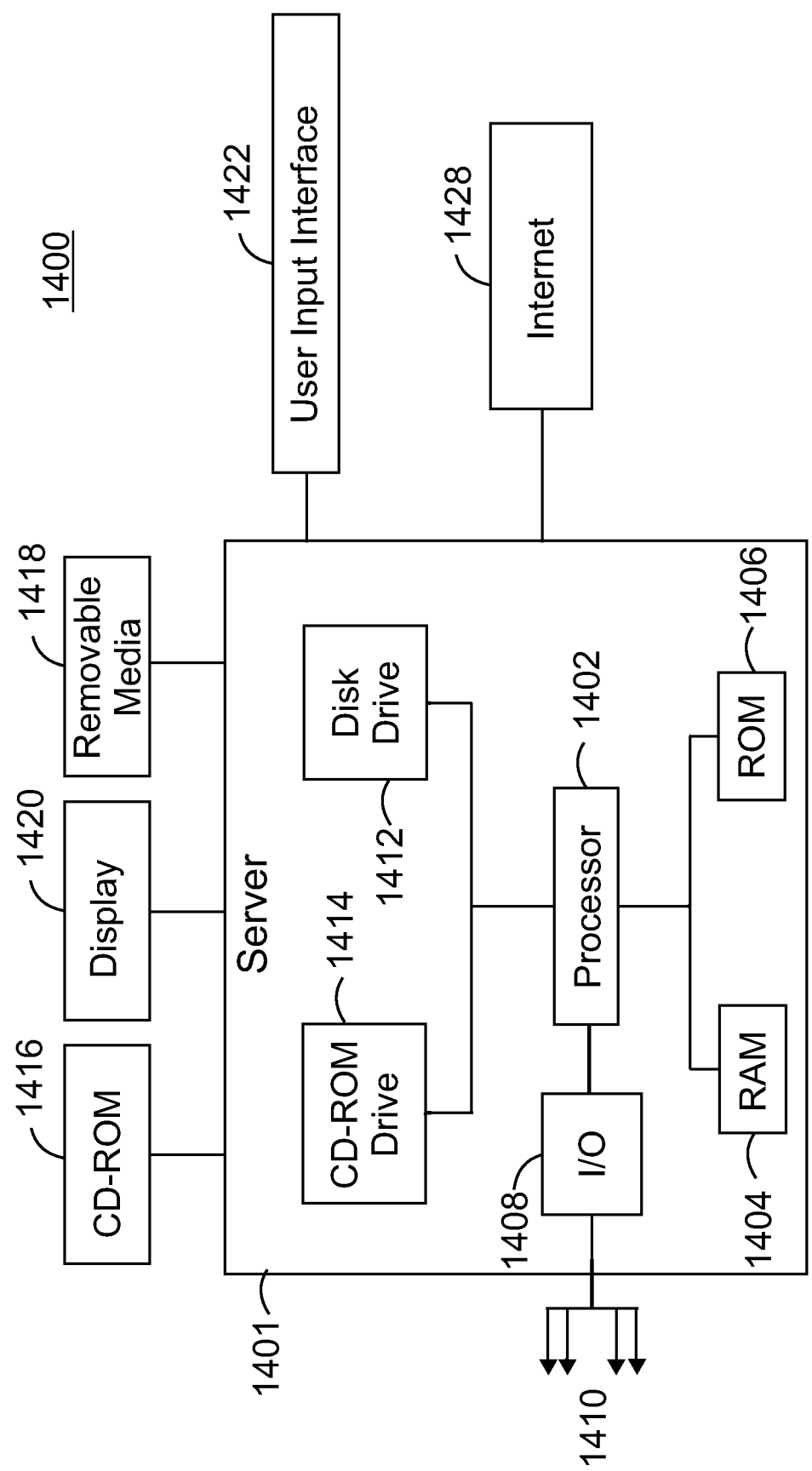
FIG. 14 is a schematic of a controller for performing motion tracking and text recognition.

The above-discussed procedures and methods may be implemented in a computing device or controller as illustrated in FIG. 14. Hardware, firmware, software or a combination thereof may be used to perform the various steps and operations described herein. Computing device 1400 of FIG. 14 is an exemplary computing structure that may be used in connection with such a system. For example, computing device 1400 may be used as the processor 130 in FIG. 1.

Exemplary computing device 1400 suitable for performing the activities described in the exemplary embodiments may include a server 1401. Such a server 1401 may include a central processor (CPU) 1402 coupled to a random access memory (RAM) 1404 and to a read-only memory (ROM) 1406. ROM 1406 may also be other types of storage media to store programs, such as programmable ROM (PROM), erasable PROM (EPROM), etc. Processor 1402 may communicate with other internal and external components through input/output (I/O) circuitry 1408 and bussing 1410 to provide control signals and the like. Processor 1402 carries out a variety of functions as are known in the art, as dictated by software and/or firmware instructions. For example, bussing 1410 may be connected to the sensors 122 shown in FIG. 1.

Server 1401 may also include one or more data storage devices, including hard drives 1412, CD-ROM drives 1414 and other hardware capable of reading and/or storing information, such as DVD, etc. In one embodiment, software for carrying out the above-discussed steps may be stored and distributed on a CD-ROM or DVD 1416, a USB storage device 1418 or other form of media capable of portably storing information. These storage media may be inserted into, and read by, devices such as CD-ROM drive 1414, disk drive 1412, etc. Server 1401 may be coupled to a display 1420, which may be any type of known display or presentation screen, such as LCD, plasma display, cathode ray tube (CRT), etc. A user input interface 1422 is provided, including one or more user interface mechanisms such as a mouse, keyboard, microphone, touchpad, touch screen, voice-recognition system, etc.

Server 1401 may be coupled to other devices, such as a smart device, e.g., a phone, tv set, computer, etc. The server may be part of a larger network configuration as in a global area network (GAN) such as the Internet 1428, which allows ultimate connection to various landline and/or mobile computing devices.

The disclosed embodiments provide methods and mechanisms for air-writing and associating the air-written characters with template gestures stored in a gesture dictionary. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] S. Gupta, D. Morris, S. Patel, and D. Tan, "Soundwave: using the doppler effect to sense gestures," in Proceedings of the SIGCHI Conference on Human Factors in Computing Systems. ACM, 2012, pp. 1911-1914.
[2] Y. Qifan, T. Hao, Z. Xuebing, L. Yin, and Z. Sanfeng, "Dolphin: Ultrasonic-based gesture recognition on smartphone platform," in Computational Science and Engineering (CSE), 2014 IEEE 17th International Conference on. IEEE, 2014, pp. 1461-1468.
[3] T. G. Zimmerman, J. Lanier, C. Blanchard, S. Bryson, and Y. Harvill, "A hand gesture interface device," in ACM SIGCHI Bulletin, vol. 18, no. 4. ACM, 1987, pp. 189-192.
[4] R.-H. Liang and M. Ouhyoung, "A real-time continuous gesture recognition system for sign language," in Automatic Face and Gesture Recognition, 1998. Proceedings. Third IEEE International Conference on. IEEE, 1998, pp. 558-567.
[5] M. Chen, G. AlRegib, and B.-H. Juang, "Air-writing recognition part i: Modeling and recognition of characters, words, and connecting motions," IEEE Transactions on Human-Machine Systems, vol. 46, no. 3, pp. 403-413, 2016.
[6] X. Zhang, Z. Ye, L. Jin, Z. Feng, and S. Xu, "A new writing experience: Finger writing in the air using a kinect sensor," IEEE MultiMedia, vol. 20, no. 4, pp. 85-93, 2013.
[7] T. Ballal and C. J. Bleakley, "Doa estimation for a multi-frequency signal using widely-spaced sensors," in Signal Processing Conference, 2010 18th European. IEEE, 2010, pp. 691-695.

What is claimed is:

1. A method for motion tracking and text recognition, the method comprising:
generating ultrasound waves with a transmitter;
receiving the ultrasound waves at a receiver, the receiver including sensors that record the ultrasound waves;
estimating with a processor, angle-of-arrival information for the ultrasound waves, wherein the angle-of-arrival information includes a horizontal angle and a vertical angle of the transmitter relative to the receiver;
associating the angle-of-arrival information with a gesture;
extracting features from the gesture, wherein the features correspond to a vector obtained from the horizontal and vertical angles; and
classifying, based on redundant dictionary matching, the gesture as a specific text character based on the extracted features by comparing the extracted features with known text characters stored in one or more templates,
wherein the one or more templates for the redundant dictionary matching are described by a matrix having a dimension n times M times 2K, with M being a number of the known text characters, n being a number of variations of each known text character, K being a number of samples of each gesture, and 2 corresponding to the horizontal and vertical angles, and
wherein the number n of variations of the each known character is obtained by shift and shrink of the each known character, which is associated with changing corresponding values of the horizontal and vertical angles of the each known character.

2. The method of claim 1, wherein the gesture is associated with movement of a user, the gesture causing the transmitter to generate the ultrasound waves.

3. The method of claim 1, wherein the redundant dictionary matching fits users with different writing speed or different writing style.

4. The method of claim 3, wherein the redundant dictionary matching includes a decision tree that is performed on at least one pair of text characters that is determined to have a similar branch.

5. The method of claim 1, further comprising:
performing continuous word recognition on a plurality of specific text characters that have been classified in the classifying.

6. The method of claim 5, wherein the continuous word recognition is performed by word segmenting and matching based on a predetermined average writing time for each of the known text characters and a comparison to each word in a known vocabulary.

7. The method of claim 5, wherein the continuous word recognition is performed by letter filtering that includes constructing a vocabulary with a predetermined number of most frequently used words and separating the most frequently used words into letters and storing the letters into a prefix tree.

8. A computing device for motion tracking and text recognition, the computing device comprising:
a receiver having sensors that record ultrasound waves associated with a gesture;
an input/output interface configured to receive the ultrasound waves recorded with the receiver; and
a processor configured to
estimate angle-of-arrival information for the ultrasound waves, wherein the angle-of-arrival information includes a horizontal angle and a vertical angle of the transmitter relative to the receiver,
associate the angle-of-arrival information with the gesture,
extract features from the gesture, wherein the features correspond to a vector obtained from the horizontal and vertical angles, and
classify, based on redundant dictionary matching, the gesture as a specific text character based on the extracted features by comparing the extracted features with known text characters stored in one or more templates,
wherein the one or more templates for the redundant dictionary matching are described by a matrix having a dimension n times M times 2K, with M being a number of the known text characters, n being a number of variations of each known text character, K being a number of samples of each gesture, and 2 corresponding to the horizontal and vertical angles, and
wherein the number n of variations of the each known character is obtained by shift and shrink of the each known character, which is associated with changing corresponding values of the horizontal and vertical angles of the each known character.

9. The device of claim 8, wherein the gesture is associated with movement of a user, the gesture causing the transmitter to generate the ultrasound waves.

10. The device of claim 8, wherein the redundant dictionary matching fits users with different writing speed or different writing style.

11. The device of claim 10, wherein the redundant dictionary matching includes a decision tree that is performed on at least one pair of text characters that is determined to have a similar branch.

12. The device of claim 8, wherein the processor is further configured to:
perform continuous word recognition on a plurality of specific text characters that have been classified in the classifying.

13. The device of claim 12, wherein the continuous word recognition is performed by word segmenting and matching based on a predetermined average writing time for each of the known text characters and a comparison to each word in a known vocabulary.

14. The device of claim 12, wherein the continuous word recognition is performed by letter filtering that includes constructing a vocabulary with a predetermined number of most frequently used words and separating the most frequently used words into letters and storing the letters into a prefix tree.

15. A non-transitory computer readable medium including computer executable instructions, wherein the instructions, when executed by a processor, implement instructions for motion tracking and text recognition, the instructions comprising:
generating ultrasound waves with a transmitter;
receiving the ultrasound waves at a receiver, the receiver including sensors that record the ultrasound waves;
estimating with a processor, angle-of-arrival information for the ultrasound waves, wherein the angle-of-arrival information includes a horizontal angle and a vertical angle of the transmitter relative to the receiver;
associating the angle-of-arrival information with a gesture;
extracting features from the gesture, wherein the features correspond to a vector obtained from the horizontal and vertical angles; and
classifying, based on redundant dictionary matching, the gesture as a specific text character based on the extracted features by comparing the extracted features with known text characters stored in one or more templates,
wherein the one or more templates for the redundant dictionary matching are described by a matrix having a dimension n times M times 2K, with M being a number of the known text characters, n being a number of variations of each known text character, K being a number of samples of each gesture, and 2 corresponding to the horizontal and vertical angles, and
wherein the number n of variations of the each known character is obtained by shift and shrink of the each known character, which is associated with changing corresponding values of the horizontal and vertical angles of the each known character.

16. The medium of claim 15, wherein the gesture is associated with movement of a user, the gesture causing the transmitter to generate the ultrasound waves.

* * * * *